United States Patent
Kasai et al.

(10) Patent No.: US 6,439,990 B1
(45) Date of Patent: Aug. 27, 2002

(54) METHOD AND APPARATUS FOR MANUFACTURING CHAIN-LIKE FOOD PRODUCTS SUCH AS SAUSAGES OR THE LIKE

(75) Inventors: Minoru Kasai; Minoru Nakamura, both of Kanagawa (JP)

(73) Assignee: HiTec Co., Ltd., Kanagawa (JP)

( * ) Notice: Subject to any disclaimer, the term of this patent is extended or adjusted under 35 U.S.C. 154(b) by 0 days.

(21) Appl. No.: 09/720,360

(22) PCT Filed: Apr. 28, 2000

(86) PCT No.: PCT/JP00/02838

§ 371 (c)(1),
(2), (4) Date: Dec. 22, 2000

(87) PCT Pub. No.: WO00/65921

PCT Pub. Date: Nov. 9, 2000

(30) Foreign Application Priority Data

May 2, 1999 (JP) ............................................. 11-161472

(51) Int. Cl.[7] ............................................... A22C 11/00
(52) U.S. Cl. .............................. 452/46; 452/47; 452/48; 452/49
(58) Field of Search .............................. 452/46, 47, 49, 452/48

(56) References Cited

U.S. PATENT DOCUMENTS

| | | | | |
|---|---|---|---|---|
| 4,905,349 A | * | 3/1990 | Townsend ..................... | 452/47 |
| 5,092,813 A | | 3/1992 | Kasai et al. | |
| 5,480,346 A | | 1/1996 | Kasai et al. | |
| 5,709,600 A | * | 1/1998 | Xie et al. ...................... | 452/46 |
| 5,788,563 A | | 8/1998 | Nakamura et al. | |
| 5,830,051 A | * | 11/1998 | Kasai et al. .................. | 452/46 |
| 5,951,391 A | * | 9/1999 | Hergott et al. ................ | 452/46 |
| 6,050,888 A | * | 4/2000 | Nakamura et al. ............ | 452/47 |
| 6,056,635 A | * | 5/2000 | Vermeer et al. .............. | 452/46 |
| 6,123,613 A | * | 9/2000 | Righele ........................ | 452/47 |

FOREIGN PATENT DOCUMENTS

| | | |
|---|---|---|
| CH | 466072 | 1/1969 |
| JP | 49-101577 | 9/1974 |
| JP | 49-101577 A | 9/1974 |
| JP | 2-286036 | 11/1990 |
| JP | 2-286036 A | 11/1990 |
| JP | 6-7073 | 1/1994 |
| JP | 6-178645 | 6/1994 |
| JP | 9-266753 A | 10/1997 |
| JP | 9-266753 | 10/1997 |
| WO | 96/41539 A1 | 12/1996 |
| WO | WO96/41539 | 12/1996 |

* cited by examiner

*Primary Examiner*—Peter M. Poon
*Assistant Examiner*—Joan Olszewski
(74) *Attorney, Agent, or Firm*—Nixon & Vanderhye (57) ABSTRACT

An apparatus (1) for manufacturing sausages as chain-like food products is comprised of: a stuffing nozzle (5) over which an unstuffed natural intestine casing (2) is fitted and which is adapted to continuously discharge a fixed amount of meat (M) as a stuffing material from a distal end (5a) into the unstuffed natural intestine casing (2) so as to form a stuffed natural intestine casing (4) forwardly of the distal end (5a), and is rotated so as to rotate the stuffed natural intestine casing (4) about an axis (X) in the direction of (A) by means of the fitted unstuffed natural intestine casing (2); and two pairs of pincher members (6a), (6b) and (7a), (7b) for consecutively pinching the stuffed natural intestine casing (4) in predetermined cycles and adapted to circulatingly move in the direction of (C) to move the pinched stuffed natural intestine casing (4) from a position forward of the distal end (5a) of the stuffing nozzle (5) further downstream (in the direction of (B)).

11 Claims, 5 Drawing Sheets

METHOD AND APPARATUS FOR MANUFACTURING CHAIN-LIKE FOOD PRODUCTS SUCH AS SAUSAGES OR THE LIKE

TECHNICAL FIELD

The present invention relates to a method and an apparatus for manufacturing chain-like food products such as sausages for automatically effecting stuffing and linking (formation of twisted portions) by mainly using a natural intestine as a casing.

BACKGROUND ART

As manufacturing methods and apparatuses of this type, those disclosed in JP-A-6-7073 and JP-A-9-266753 are known. JP-A-6-7073 discloses an apparatus for stuffing and linking natural intestine sausages whose link lengths are nonuniform, the apparatus comprising a material supplying means for intermittently supplying a material each in a fixed amount into a natural intestine casing and a pinching means and a pinching means for pinching the stuffed natural intestine casing by operating in synchronism with the intermittent supply of the material. Meanwhile, JP-A-9-266753 discloses an apparatus for stuffing and linking natural intestine sausages whose link lengths are uniform, the apparatus comprising a material supplying means for continuously supplying a fixed amount of a material into a natural intestine casing and pincher members attached to a wrapping connector means at fixed intervals.

The link lengths of the natural intestine sausages in the apparatus of JP-A-6-7073 are difficult to be made uniform since they are affected by the variation of the amount of casing being pulled out from a stuffing nozzle on the basis of the discharge pressure of one portion of the material. Therefore, the stuffing degrees (stuffing densities) of the links are also difficult to be made uniform.

In the apparatus of JP-A-9-266753, since the attaching intervals of the pincher members are fixed, if the variation of the diameter of the natural intestine casing is excessively large, the stuffing degrees of the links having a desired fixed weight are affected by it. Hence, if the diameter of the natural intestine casing is small, the stuffing degree becomes excessively large, so that the natural intestine casing punctures, whereas if the diameter of the natural intestine casing is large, the stuffing degree becomes excessively small, and creases occur.

The present invention has been devised in view of the above-described various aspects, and its object is to provide a method and an apparatus for manufacturing chain-like food products such as sausages which are simple in arrangement and which permit the high-speed production of both natural intestine sausages having a fixed quantity, a high stuffing density (tensioned link shape), and a substantially uniform link length and sausages using a natural intestine whose variation of the diameter is particularly large.

DISCLOSURE OF THE INVENTION

The method in accordance with a first aspect of the present invention is a method for manufacturing chain-like food products such as sausages in which a stuffing material is continuously discharged from a distal end of a stuffing nozzle into an unstuffed casing fitted over the stuffing nozzle to form a stuffed casing forwardly of the distal end of the stuffing nozzle, the stuffed casing being rotated is pinched by pincher members each circulatingly moving about at least two rotational centers, and the pinched stuffed casing is moved in a downstream direction from the distal end of the stuffing nozzle together with the pincher members so as to form a twist in a portion of the stuffed casing pinched by the pincher members, comprising the step of: effecting an ensuing pinching following one pinching of the stuffed casing by the pincher members after the cancellation of the one pinching and after the lapse of a predetermined time so that a moving speed of the stuffed casing moving in a state in which the pinching by the pincher members has been canceled can be changed.

The method in accordance with another aspect of the present invention is a method for manufacturing chain-like food products such as sausages in which a stuffing material is continuously discharged from a distal end of a stuffing nozzle into an unstuffed casing fitted over the stuffing nozzle to form a stuffed casing forwardly of the distal end of the stuffing nozzle, the stuffed casing being rotated is pinched by pincher members each circulatingly moving about at least two rotational centers, and the pinched stuffed casing is moved in a downstream direction from the distal end of the stuffing nozzle together with the pincher members so as to form a twist in a portion of the stuffed casing pinched by the pincher members, comprising the step of: effecting an ensuing pinching following one pinching of the stuffed casing by the pincher members after the cancellation of the one pinching and after the lapse of a predetermined time so that the stuffed casing whose pinching by the pincher members has been canceled is moved by the discharge pressure of the stuffing material discharged from the distal end of the stuffing nozzle.

In the method in accordance with still another aspect of the present invention, the stuffed casing whose pinching by the pincher members has been canceled is clamped by stuffed-casing holding means which moves along the same circulatingly moving path as that of the pincher members, so as to impart a force for moving the stuffed casing to the stuffed casing.

The apparatus for manufacturing chain-like food products such as sausages in accordance with the first aspect of the present invention includes a stuffing nozzle over which an unstuffed casing is fitted and which is adapted to continuously discharge a stuffing material from a distal end thereof into the unstuffed casing so as to form a stuffed natural intestine casing forwardly of the distal end, and pincher members which are disposed on circulating endless members each adapted to circulatingly travel about at least two rotational centers and move in a downstream direction from the distal end of the stuffing nozzle while pinching the stuffed casing, so as to form a twist in a pinched portion of the stuffed casing by the rotation of the stuffed casing and the pinching by the pincher members, the apparatus comprising: means for effecting an ensuing pinching following one pinching of the stuffed casing by the pincher members after the cancellation of the one pinching and after the lapse of a predetermined time so that a moving speed of the stuffed casing moving in a state in which the pinching by the pincher members has been canceled can be changed.

The apparatus for manufacturing chain-like food products such as sausages in accordance with the other aspect of the present invention includes a stuffing nozzle over which an unstuffed casing is fitted and which is adapted to continuously discharge a stuffing material from a distal end thereof into the unstuffed casing so as to form a stuffed natural intestine casing forwardly of the distal end, and pincher members which are disposed on circulating endless members each adapted to circulatingly travel about at least two rotational centers and move in a downstream direction from the distal end of the stuffing nozzle while pinching the stuffed casing, so as to form a twist in a pinched portion of the stuffed casing by the rotation of the stuffed casing and the pinching by the pincher members, the apparatus comprising: means for effecting an ensuing pinching following one pinching of the stuffed casing by the pincher members after the cancellation of the one pinching and after the lapse of a predetermined time so that the stuffed casing whose pinching by the pincher members has been canceled is moved by the discharge pressure of the stuffing material discharged from the distal end of the stuffing nozzle.

In accordance with the present invention, since the stuffed casing is moved with the pincher members for a predetermined time, the length of the stuffed casing formed in the meantime become uniform. Subsequently, since the pinching of the stuffed casing by the pincher members is canceled, the stuffed casing which moves by receiving the stuffing discharge pressure moves at a slow moving speed if the diameter of the casing is large and at a fast moving speed if the diameter of the casing is small, so that the stuffing degree thereof becomes substantially uniform. As a result, even if a natural intestine casing having variations in its diameter is used, it is possible to effect high-speed production of chain-like natural intestine sausages consisting of links having a fixed quantity, a high (fixed) stuffing density (tensioned link shape), and a substantially uniform link length.

In accordance with the present invention, a moving force can be imparted to the stuffed casing which is moving by the stuffing discharge pressure by the stuffed-casing holding means which moves with the pincher members at the same speed in a state in which the pinching has been canceled. This permits the formation of links having less variation of length and a reduction of the occurrence of breakage of the natural intestine casing attributable to the stuffing discharge pressure. It is possible to appropriately set the magnitude of the moving force to be imparted in accordance with the characteristics of the natural intestine casing such as the magnitude of the variation and the mechanical strength of the natural intestine casing used.

The present invention is optimally suitable for the manufacture of sausages using a natural intestine casing, e.g., a hog casing or a sheep casing. However, the present invention is not limited to the same, and may be applied to the manufacture of sausages using an artificial casing such as a cellulose casing or a collagen casing.

Next, a description will be given of the present invention and its embodiments with reference to the preferred embodiments illustrated in the drawings. It should be noted that the present invention is not limited to these embodiments.

BEST MODE FOR CARRYING OUT THE INVENTION

In FIGS. 1 to 4, an apparatus 1 of this embodiment for manufacturing sausages as chain-like food products is comprised of: a stuffing nozzle 5 over which an unstuffed natural intestine casing 2 as an unstuffed casing is fitted and which is adapted to continuously discharge a fixed amount of meat M as a stuffing material from a distal end 5a into the unstuffed natural intestine casing 2 so as to form a stuffed natural intestine casing 4 forwardly of the distal end 5a, and is rotated so as to rotate the stuffed natural intestine casing 4 about an axis X in the direction of A by means of the fitted unstuffed natural intestine casing 2; a pinching means 3 for consecutively pinching the stuffed natural intestine casing 4 in predetermined cycles and for moving the pinched stuffed natural intestine casing 4 from the position forward of the distal end 5a of the stuffing nozzle 5 further downstream (in the direction of B); an annular braking member 8 formed of an elastic member such as rubber and fitted at a position longer than the outside diameter of the stuffing nozzle 5 from the distal end 5a of the stuffing nozzle 5, such that its inner peripheral edge comes into contact with an outer peripheral surface of the unstuffed natural intestine casing 2 over the stuffing nozzle 5 so as to apply a brake to the movement of the unstuffed natural intestine casing 2 in the direction of B; a meat supplying means (pump) 9 for continuously supplying the meat M into the stuffing nozzle 5; a driving means 30 for driving the meat supplying means 9; a rotatively driving means 31 for rotating the stuffing nozzle 5 about the axis X in the direction of A; and a driving means 32 for driving the pinching means 3.

Figure 1:
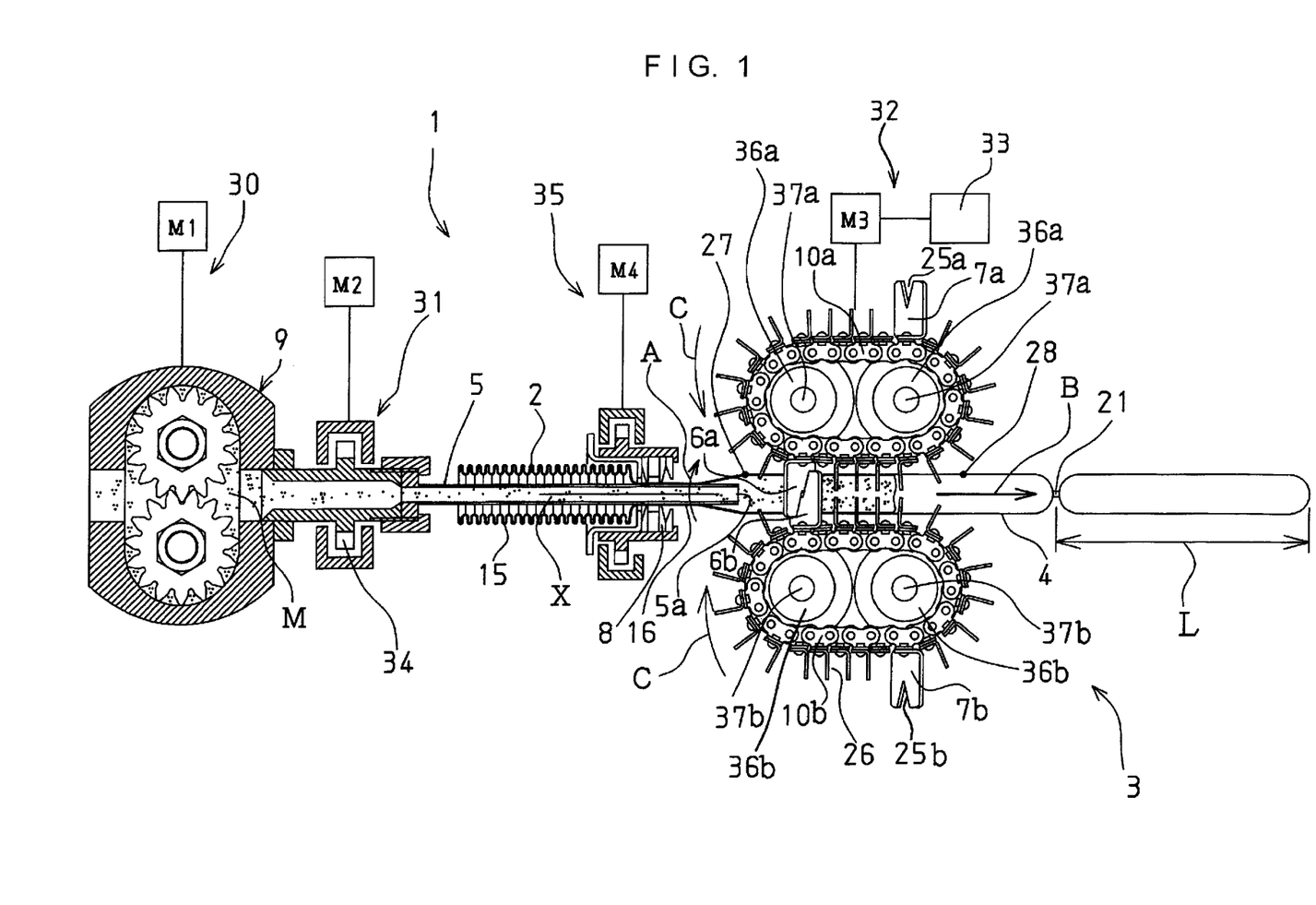
FIG. 1 is an explanatory diagram of a preferred embodiment of the present invention.

The driving means 30 for the meat supplying means 9 has a motor M1. The rotatively driving means 31 for the stuffing nozzle 5 has a motor M2 and a spindle 34 which rotates by receiving the drive of the motor M2. The spindle 34 is formed by a hollow cylindrical member having a passage for the meat M, and its rear portion is rotatably connected to the meat supplying means 9, the stuffing nozzle 5 being fixed to its front portion. The driving means 32 for the pinching means 3 has a motor M3 and a controlling means 33 for controlling the number of revolutions of the motor M3.

The apparatus 1 may be provided with a rotatively driving means 35 for the braking member 8 which operates in synchronism with the rotatively driving means 31 for the stuffing nozzle 5 so as to rotate the braking member 8 in synchronism with the stuffing nozzle 5. The rotative driving of the unstuffed natural intestine casing 2 by the braking member 8 assists the rotative driving of the unstuffed casing 2 by the stuffing nozzle 5.

Figure 2:
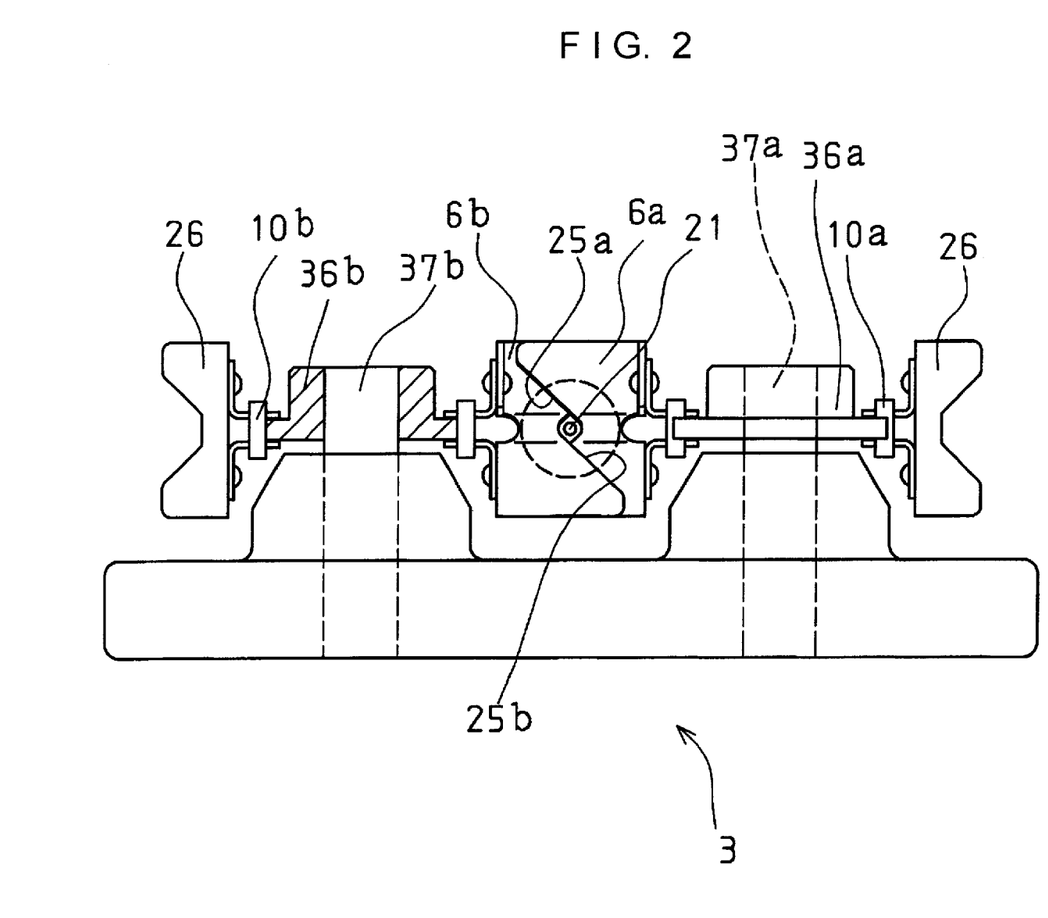
FIG. 2 is a side elevational view mainly illustrating the details of pincher members of a pinching means of the embodiment shown in FIG. 1.
Figure 3:
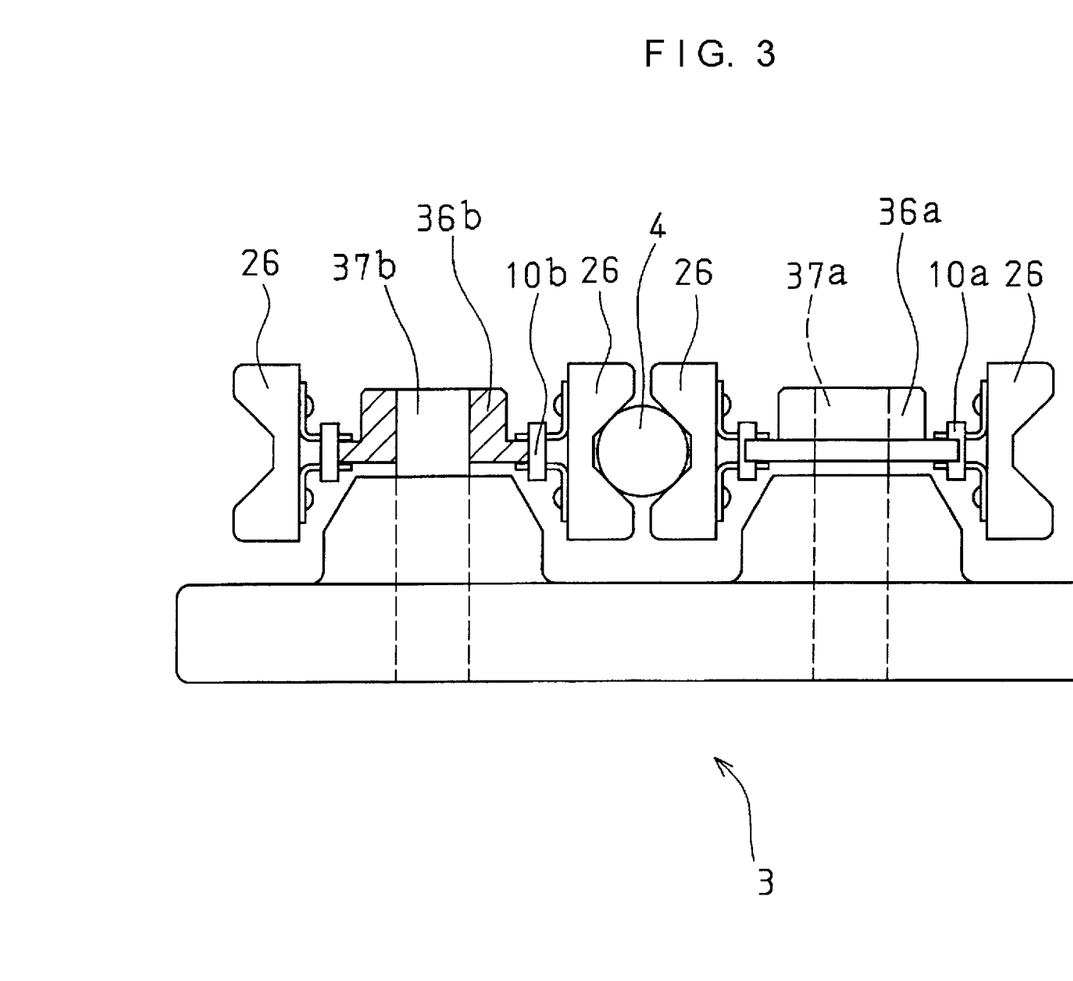
FIG. 3 is a side elevational view mainly illustrating lugs of the pinching means of the embodiment shown in FIG. 1.

The pinching means 3 has two pairs of pincher members 6a, 6b and 7a, 7b which circulatingly move in the direction of C; endless chains 10a and 10b which are wrapping connectors as circulating endless members for circulatingly moving the pincher members continuously at a fixed speed in the direction of C; two pairs of sprockets 36a, 36a and 36b, 36b between which the pair of endless chains are respectively trained; and rotating shafts 37a, 37a and 37b, 37b to which the sprockets are attached and which constitute two pairs of rotational centers.

One pair of pincher members 6a and 6b and the other pair of pincher members 7a and 7b are respectively attached to the endless chains 10a and 10b at an interval corresponding to one link length L. The pincher members 6a and 6b respectively have recesses 25a and 25b, mesh with each other at the recesses 25a and 25b, and are adapted to pinch the stuffed natural intestine casing 4 by this meshing. The respective pincher members 7a and 7b are also formed in a similar manner.

A multiplicity of lugs 26 serving as a stuffed-casing holding means for holding the stuffed natural intestine casing 4 are attached to the endless chains 10a and 10b, and the lugs 26 are adapted to hold the shape of the stuffed natural intestine casing 4 by loosely coming into contact with the outer peripheral surface of the stuffed natural intestine casing 4.

The apparatus 1 for manufacturing sausages is adapted to operate as follows. First, the unstuffed natural intestine casing 2 is fitted over the stuffing nozzle 5 in such a manner as to be provided with a shirred portion 15 in which the unstuffed natural intestine casing 2 is shrunk in the direction of the axis X and an unshirred portion 16 in which the unstuffed natural intestine casing 2 is unshirred and extended in the direction of the axis X. As a fixed amount of the meat M is continuously discharged from the distal end 5a of the stuffing nozzle 5, the meat is continuously filled into the unstuffed natural intestine casing 2 which is being unshirred and pulled out from the distal end 5a of the stuffing nozzle 5, thereby continuously forming the stuffed natural intestine casing 4 forwardly of the distal end 5a of the stuffing nozzle 5. This stuffed natural intestine casing 4 is completely pinched by the pair of pincher members 6a and 6b which have been moved to a mutually meshing position, as shown in FIG. 1, by being moved by the endless chains 10a and 10b and after passing a pinching start position 27. By means of this pinched portion, the stuffed natural intestine casing 4 moves in the direction of B together with the pair of pincher members 6a and 6b being moved in the direction of B. During its movement in the direction of B, the stuffed natural intestine casing 4 is twisted at the pinched portion by its rotation in the same direction of A by means of the unstuffed natural intestine casing 2 due to the rotation of the stuffing nozzle 5 in the direction of A. A twisted portion 21 is formed in the stuffed natural intestine casing 4 owing to this twisting.

The unshirred portion 16 located on the stuffing nozzle 5 between the braking member 8 and the distal end 5a is pulled by the stuffed natural intestine casing 4 and has its diameter reduced when the stuffed natural intestine casing 4 is moved in the direction of B together with the pincher members 6a, 6b and 7a, 7b. Consequently, the unshirred portion 16 is partially brought into close contact with an outer peripheral surface of the stuffing nozzle 5, and rotates together with the stuffing nozzle 5. When the pinching of the stuffed casing 4 by the pincher members is canceled, the tensile force applied to the unshirred portion 16 decreases, so that the degree of the reduction of the diameter of the unshirred portion 16 decreases. However, since the length of close contact between the unshirred portion 16 and the stuffing nozzle 5 is long, the unshirred portion 16 is capable of its rotation with the stuffing nozzle 5.

Figure 4:
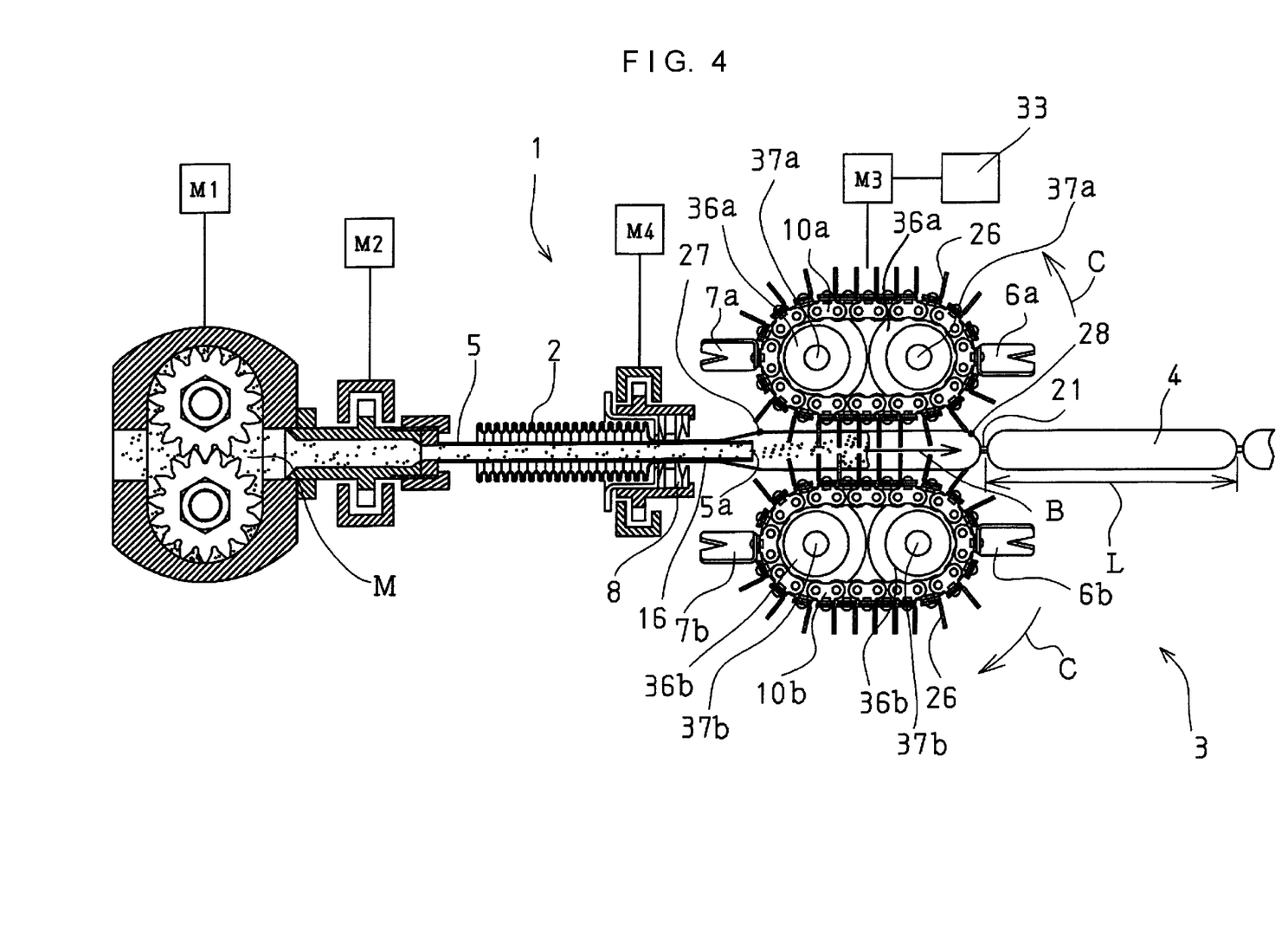
FIG. 4 is a diagram explaining the operation of the embodiment shown in FIG. 1

After the formation of the twisted portion 21, the pair of pincher members 6a and 6b at the same time as the cancellation of their meshing passes a pinching-completion position 28 while canceling the pinching of the stuffed natural intestine casing 4, and is moved to the position shown in FIG. 4. In this state, the stuffed natural intestine casing 4 in which the twisted portion 21 has been formed is not pinched by the ensuing pair of pincher members 7a and 7b, and simply remains held by the lugs 26 which move in the direction of B. The stuffed natural intestine casing 4 in the state in which it is held only by the lugs 26 is further charged with the meat M being discharged from the stuffing nozzle 5, and is moved in the direction of B by the discharge pressure of the meat M. The amount of movement of the stuffed natural intestine casing 4 due to the discharge pressure of the meat M is not fixed since the diameter of the natural intestine casing 15 varies.

When the pair of pincher members 7a and 7b then passes the pinching start position 27 due to the further traveling of the endless chains 10a and 10b shifting from the state shown in FIG. 4, and are moved to the mutually meshing position as shown in FIG. 1, this time the stuffed natural intestine casing 4 is pinched by the pincher members 7a and 7b, and is moved in the direction of B together with the pincher members 7a and 7b by means of its newly pinched portion. During its movement in this direction of B, the stuffed natural intestine casing 4 is twisted at the new pinched portion by the rotation of the stuffing nozzle 5, so that a newly twisted portion is formed in the stuffed natural intestine casing 4. The amount of movement of the stuffed casing 4 which is moved until the new twisted portion 21 is formed is not fixed as described above, so that the interval between the twisted portion 21 formed by the pinching by the pincher members 6a and 6b and the twisted portion 21 formed by the pinching by the pincher members 7a and 7b, i.e., the link length L of one link, is not fixed, either.

With the apparatus 1 for manufacturing sausages, while the pinching and movement of the stuffed natural intestine casing 4 by the pincher members 6a, 6b and 7a, 7b are being interrupted for a predetermined time, a fixed amount of meat M is charged into the stuffed natural intestine casing 4 in which the twisted portion 21 has already been formed forwardly; hence, the amount of movement of the stuffed casing 4 is changed in correspondence with the variation of the diameter of the natural intestine casing 15, and links having satisfactory high stuffing degrees are consequently formed.

By repeating the above-described sequence, the apparatus 1 for manufacturing sausages forms chain-like natural intestine sausages forwardly of the distal end 5a of the stuffing nozzle 5, the sausages consisting of a multiplicity of links having a fixed quantity, a high stuffing density, and a substantially uniform link length L but whose lengths are mutually different.

In the apparatus 1 for manufacturing sausages, it is possible to manufacture sausages having a link length larger than the link length L. In the state in which the movement of the stuffed natural intestine casing 4 by the pincher members 6a, 6b and 7a, 7b in the direction of B is interrupted as shown in FIG. 4, the traveling of the endless chains 10a and 10b is stopped temporarily, or the traveling speed is delayed. The pinching operation of the pincher members 6a, 6b and 7a, 7b is set on standby or delayed, and after the stuffed natural intestine casing 4 in a desired stuffing quantity has been moved in the direction of B by the discharge pressure of the meat M being discharged from the stuffing nozzle 5 while sliding on the lugs 26 while being held by the lugs 26, the traveling of the endless chains 10a and 10b is started, and the pinching operation of the pincher members 6a and 6b or 7a and 7b is started. This control of the traveling speed of the endless chains 10a and 10b is effected on the basis of the number-of-revolution control of the motor M3.

Next, referring to FIG. 5, a description will be given of an apparatus 1a for manufacturing sausages having a pinching means 3a in which only one pair of pincher members 6a and 6b are attached to the endless chains 10a and 10b. The pinching means 3a has the pair of pincher members 6a and 6b which circulatingly move in the direction of C; the endless chains 10a and 10b which are wrapping connectors as circulating endless members for circulatingly move the pincher members continuously at a fixed speed in the direction of C; the two pairs of sprockets 36a, 36a and 36b, 36b between which the pair of endless chains are respectively trained; the rotating shafts 37a, 37a and 37b, 37b to which the sprockets are attached and which constitute two pairs of rotational centers; and the multiplicity of lugs 26 attached to the endless chains over their entire lengths at predetermined intervals. The endless chains 10a and 10b have a length corresponding to the link length L of the natural intestine sausage links to be manufactured. The apparatus 1a manufactures sausages having the link length L as the endless chains are made to travel continuously at a fixed speed.

The apparatus 1a for manufacturing sausages is adapted to operate as follows. The endless chains 10a and 10b are made to circulatingly travel continuously at a fixed speed so as to cause the pincher members 6a and 6b and the lugs 26 to circulatingly move continuously at the fixed speed. The pincher members 6a and 6b pinch the stuffed natural intestine casing 4 at a predetermined fixed cycle, and the lugs 26 constantly hold the stuffed natural intestine casing 4 during the circulating movement. When the pincher members 6a and 6b cancel the pinching of the stuffed natural intestine casing 4, in the same way as the above-described apparatus 1, the stuffed natural intestine casing 4 is moved in the direction of B by the stuffing discharge pressure of a fixed amount of meat M being continuously discharged from the distal end 5a of the stuffing nozzle 5. As a result, in the same way as the apparatus 1, the apparatus 1a manufactures natural intestine sausages having a fixed quantity, a high stuffing density, and a substantially uniform link length.

Figure 5:
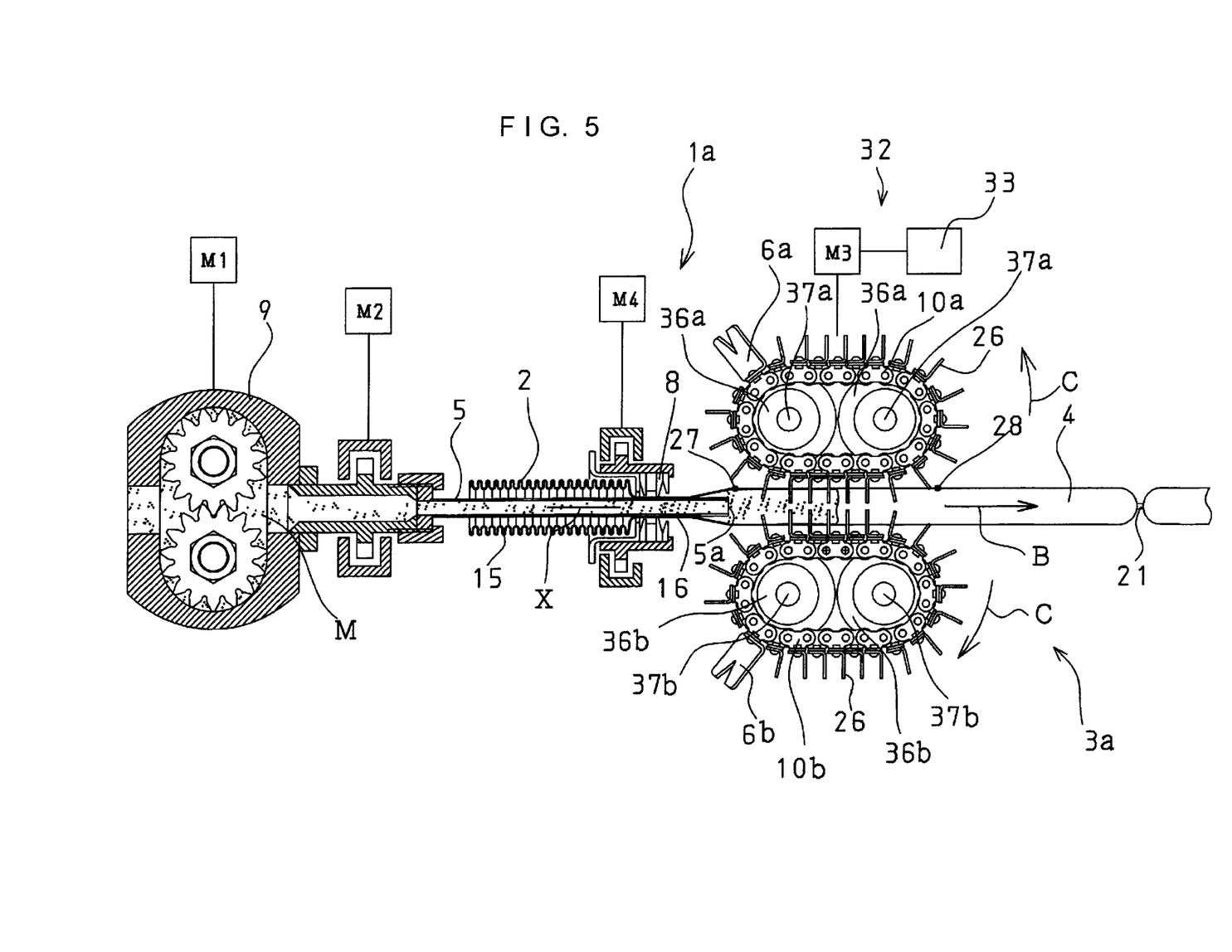
FIG. 5 is an explanatory diagram of another preferred embodiment of the present invention.

In the process in which the pincher members 6a and 6b are moving toward the stuffed natural intestine casing 4 for ensuing pinching after canceling the pinching of the stuffed casing 4 as shown in FIG. 5, it is possible to impart the moving force in the direction of B to the stuffed natural intestine casing 4 by increasing the clamping force of the stuffed natural intestine casing 4 by the lugs 26 which are moving in the direction of B. Consequently, the stuffed natural intestine casing 4 is moved by the discharged meat M and the lugs 26.

In this apparatus 1a, since the links are formed by the pair of pincher members 6a and 6b, in the processing of forming the links having the link length L, the moving distance of the stuffed natural intestine casing 4 which moves without being pinched by the pincher members 6a and 6b is longer than the moving distance of the stuffed natural intestine casing 4 which moves while being pinched by the pincher members 6a and 6b. Therefore, this apparatus 1a is suitable for the use of natural intestine casings having greater variations of the diameter.

With the apparatus 1a, the link length L of the sausages to be manufactured can be changed by circulatingly moving the pincher members 6a and 6b at varied speeds. If the movement of the pincher members from the cancellation of the pinching by the pincher members 6a and 6b until the start of ensuing pinching by the pincher members is made faster than the movement of the pincher members during the pinching of the stuffed natural intestine casing 4, it is possible to manufacture sausages having a link length shorter than the link length L. Conversely, if that movement is delayed or temporarily stopped, it is possible to manufacture sausages having a link length longer than the link length L.

In accordance with the present invention, it is possible to provide a method and an apparatus for manufacturing chain-like food products such as sausages which are simple in arrangement and which permit the high-speed production of sausages having a fixed quantity, a high stuffing density, and a substantially uniform link length using a natural intestine having variations in its diameter and the high-speed production of sausages using a natural intestine casing whose variation of the diameter is particularly large.

What is claimed is:

1. A method for manufacturing chain-like food products in which a stuffing material is continuously discharged from a distal end of a stuffing nozzle into an unstuffed casing fitted over said stuffing nozzle to form a stuffed casing forwardly of the distal end of said stuffing nozzle, the stuffed casing being rotated is pinched by pincher members each circulatingly moving about at least two rotational centers, and the pinched stuffed casing is moved in a downstream direction from the distal end of said stuffing nozzle together with said pincher members so as to form a twist in a portion of the stuffed casing pinched by said pincher members, comprising the step of:

effecting an ensuing pinching following one pinching of the stuffed casing by said pincher members after the cancellation of the one pinching and after the lapse of a predetermined time so that a moving speed of the stuffed casing moving in a state in which the pinching by said pincher members has been canceled can be changed.

2. The method for manufacturing chain-like food products according to claim 1, wherein the stuffed casing whose pinching by said pincher members has been canceled is moved by the discharge pressure of the stuffing material from the distal end of said stuffing nozzle.

3. A method for manufacturing chain-like food products in which a stuffing material is continuously discharged from a distal end of a stuffing nozzle into an unstuffed casing fitted over said stuffing nozzle to form a stuffed casing forwardly of the distal end of said stuffing nozzle, the stuffed casing being rotated is pinched by pincher members each circulatingly moving about at least two rotational centers, and the pinched stuffed casing is moved in a downstream direction from the distal end of said stuffing nozzle together with said pincher members so as to form a twist in a portion of the stuffed casing pinched by said pincher members, comprising the step of:

effecting an ensuing pinching following one pinching of the stuffed casing by said pincher members after the cancellation of the one pinching and after the lapse of a predetermined time so that the stuffed casing whose pinching by said pincher members has been canceled is moved by the discharge pressure of the stuffing material discharged from the distal end of said stuffing nozzle.

4. The method for manufacturing chain-like food products according to claim 1, wherein the stuffed casing whose pinching by said pincher members has been canceled is clamped by stuffed-casing holding means which moves along the same circulatingly moving path as that of said pincher members, so as to impart a force for moving the stuffed casing to the stuffed casing.

5. An apparatus for manufacturing chain-like food products including a stuffing nozzle over which an unstuffed casing is fitted and which is adapted to continuously discharge a stuffing material from a distal end thereof into the unstuffed casing so as to form a stuffed natural intestine casing forwardly of the distal end, and pincher members which are disposed on circulating endless members each adapted to circulatingly travel about at least two rotational centers and move in a downstream direction from the distal end of said stuffing nozzle while pinching the stuffed casing, so as to form a twist in a pinched portion of the stuffed casing by the rotation of the stuffed casing and the pinching by said pincher members, said apparatus comprising:

means for effecting an ensuing pinching following one pinching of the stuffed casing by said pincher members after the cancellation of the one pinching and after the lapse of a predetermined time so that a moving speed of the stuffed casing moving in a state in which the pinching by said pincher members has been canceled can be changed.

6. An apparatus for manufacturing chain-like food products including a stuffing nozzle over which an unstuffed casing is fitted and which is adapted to continuously discharge a stuffing material from a distal end thereof into the unstuffed casing so as to form a stuffed natural intestine casing forwardly of the distal end, and pincher members which are disposed on circulating endless members each adapted to circulatingly travel about at least two rotational centers and move in a downstream direction from the distal end of said stuffing nozzle while pinching the stuffed casing, so as to form a twist in a pinched portion of the stuffed casing by the rotation of the stuffed casing and the pinching by said pincher members, said apparatus comprising:

means for effecting an ensuing pinching following one pinching of the stuffed casing by said pincher members after the cancellation of the one pinching and after the lapse of a predetermined time so that the stuffed casing whose pinching by said pincher members has been canceled is moved by the discharge pressure of the stuffing material discharged from the distal end of said stuffing nozzle.

7. The apparatus for manufacturing chain-like food products according to claim 5, wherein said circulating endless members include stuffed-casing holding means which juxtaposed with said pincher members and adapted to clamp an outer surface of the stuffed casing.

8. The apparatus for manufacturing chain-like food products according to any one of claim 5, wherein said circulating endless members are formed by a pair of wrapping connectors arranged in such a manner as to oppose each other, and one pincher member is disposed on each of said wrapping connectors.

9. The apparatus for manufacturing chain-like food products according to any one of claim 5, wherein said circulating endless members are formed by a pair of wrapping connectors arranged in such a manner as to oppose each other, and two pincher members are disposed on each of said wrapping connectors at equal intervals.

10. The apparatus for manufacturing chain-like food products according to any one of claim 5, wherein the unstuffed casing is a natural intestine casing, and an annular braking member whose inner peripheral edge comes into contact with an outer peripheral surface of the unstuffed natural intestine casing is disposed over said stuffing nozzle.

11. The method for manufacturing chain-like food products according to any one of claim 1 wherein the unstuffed casing is a natural intestine casing.

* * * * *

UNITED STATES PATENT AND TRADEMARK OFFICE
CERTIFICATE OF CORRECTION

PATENT NO. : 6,439,990 B1
DATED : August 27, 2002
INVENTOR(S) : Kasai et al.

It is certified that error appears in the above-identified patent and that said Letters Patent is hereby corrected as shown below:

<u>Title page,</u>
Item [73], delete "HiTec" and insert -- HITEC --

<u>Column 10,</u>
Lines 7, 13, 19 and 25, delete "any one of".

Signed and Sealed this

Thirty-first Day of December, 2002

JAMES E. ROGAN
*Director of the United States Patent and Trademark Office*